United States Patent [19]

Oxley

[11] 4,091,885
[45] May 30, 1978

[54] WEIGHT SENSING APPARATUS

[75] Inventor: Arthur R. Oxley, Wadsworth, Ohio

[73] Assignee: Advance Weight Systems, Inc., Medina, Ohio

[21] Appl. No.: 718,811

[22] Filed: Aug. 30, 1976

[51] Int. Cl.² .................... G01G 23/08; G01G 3/14
[52] U.S. Cl. ................................. 177/188; 177/211
[58] Field of Search .............. 177/211, 184, 229, 188, 177/255

[56] References Cited

U.S. PATENT DOCUMENTS

| 2,720,111 | 10/1955 | Clark | 177/211 X |
| 2,955,811 | 10/1960 | Jonas et al. | 177/211 X |
| 3,387,679 | 6/1968 | Giulie et al. | 177/229 X |
| 3,443,653 | 5/1969 | Marshall | 177/229 X |
| 3,812,924 | 5/1974 | Fletcher et al. | 177/211 X |

Primary Examiner—George H. Miller, Jr.
Attorney, Agent, or Firm—Perry Reese Taylor

[57] ABSTRACT

An improved weight sensing apparatus wherein the output signal of a transducer and, therefore, the reading on a weight meter is rendered accurate regardless of the location of the load. The invention includes providing a set of stabilizing flexures forming a parallelogram with the flexures interconnecting a fixed base and a movable outrider which is adapted to receive the load. A beam balance lever has one end secured to the outrider, and the other end is mass balanced and is built into the parallelogram so that the reduced section of the transducer which interconnects the beam and the fixed base is in alignment with either the top or bottom flexures of the parallelogram. The load end of the lever is secured to the outrider by means of a vertical flexure, loaded in tension, so as to carry the force created by the load into the lever from the outrider; and, in this fashion, avoids rendering the device sensitive to the precise placement of the load on the outrider. Also disclosed is an improved hydraulic damper with the well of the damper attached to the outrider so that it moves with the outrider in response to the force created by the load while the plunger is fixed against inadvertent movement and is externally adjustable to control the damping factor.

7 Claims, 7 Drawing Figures

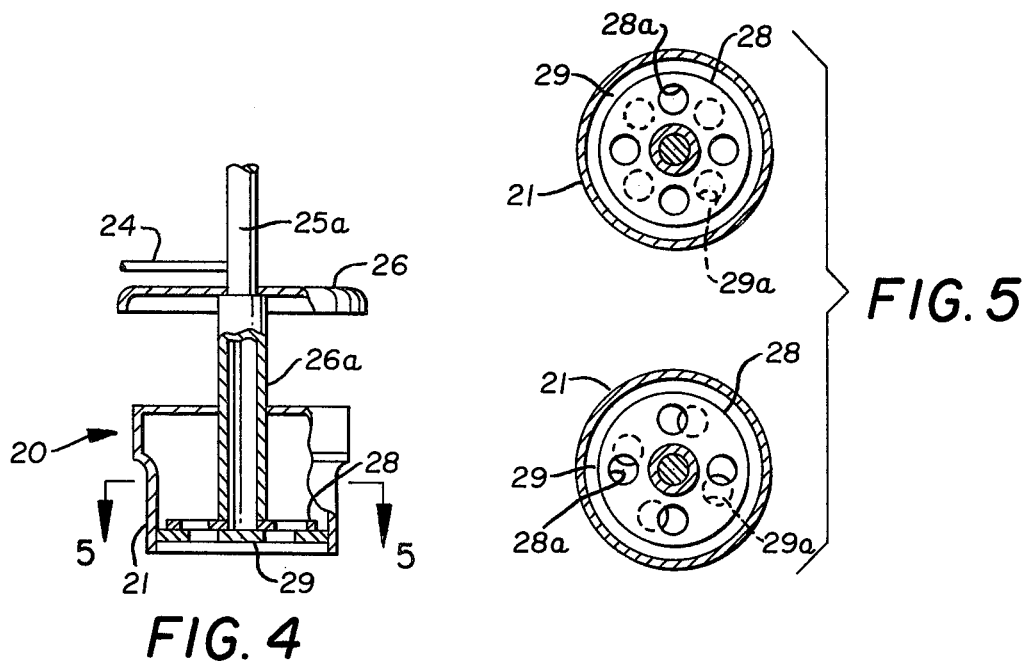
FIG. 4
FIG. 5
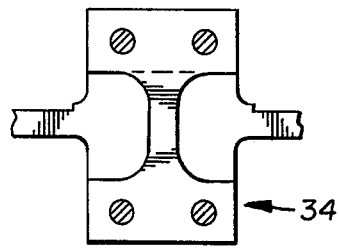
FIG. 6
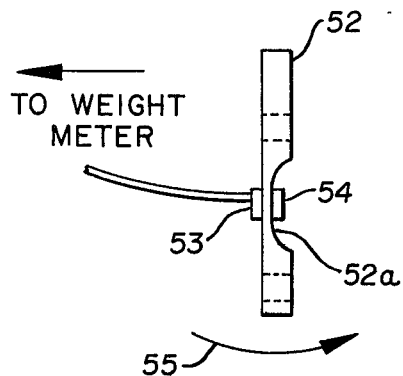
FIG. 7

WEIGHT SENSING APPARATUS

FIELD OF THE INVENTION

This invention in general relates to weighing devices and, in particular, relates to a weighing device utilizing a transducer to reflect the movement of the scale, and thereby gauge the weight of the object being weighed and to reflect that weight on a weight meter. Thus, the invention is intended to provide a scale which will yield an electronic signal which is essentially linearly proportional to weight, quite stable and insensitive to load location.

DESCRIPTION OF THE PRIOR ART

There are a number of prior art patents relevant to this field, such as Jonas U.S. Pat. Nos. 2,955,811 and Ruge 2,597,751. Perhaps one of the most pertinent would be Oxley U.S. Pat. No. 3,788,411. While this last patent discloses a bending beam arrangement stabilized by flexures and a mass balanced counter weight arrangement, there are some difficulties as a practical matter with this type structure, as well as with the other prior art.

First of all, with some of the prior art known to the applicant, the transducer is disposed within the parallelogram and is, therefore, susceptable to damage. This is disadvantageous since this is a relatively sensitive and expensive part of the overall apparatus.

Furthermore, most of the prior art scales and load cells known to the applicant have deficiencies in that the accuracy of the reading by the weight meter which is attached to the transducer and strain gauges is affected by the disposition or location of the load. Also, in some of the prior art the load is attached or applied directly to the lever arm also causing inaccuracy in the read out. Furthermore, this reading inaccuracy is basically occasioned by the position of the load; or, on other words, by its remoteness or closeness to the fulcrum point of the lever.

Furthermore, in most of the prior art load cell devices known to applicant damping against vibration is unsatisfactory because in a high accuracy application, a spring-mass system has such a low natural frequency that the electronic damping of the oscillators is not practicable. Mass balancing is also a problem in that dead loads reduce the usable range of the device.

Furthermore, most prior art damping devices are difficult to gain access to once the device is assembled, either for replacement of the transducer or adjustment of the damping means.

SUMMARY OF THE INVENTION

It has been discovered that the foregoing disadvantages can be substantially overcome by providing a set of stabilizing flexures which form a parallelogram and which interconnect a fixed base and a movable outrider with the load being applied to the outrider itself.

It has further been found that if the transducer assembly is clamped in place and used to interconnect the lever and the fixed base so that it is in alignment with either the upper or lower parallelogram flexures and the load end of the lever is attached to the outrider by a vertical flexure loaded in tension that, in this fashion, the combined assembly is not sensitive to the placement of the load since it can be placed in any position on the platform portion of the outrider without distortion of the reading on the weight meter.

Thus, clamping the transducer in this fashion insures that the relationship between the mechanical balance point of the scale and the electronic zero balance cannot change.

Also, locating the transducer in this way insures that it is not part of the flexure parallelogram; it is protected from side loads and off-center loads by the flexure parallelogram, and it can be replaced without disassembly of the flexures. Additionally, using the transducer as a fulcrum and clamping an adjustable counter balance to the lever permits the scale to accommodate considerable dead loads without sacrificing usable range.

It has also been found that improved damping characteristics can be achieved by utilizing a hydraulic damper, the well of which is attached to the outrider while the plunger is fixed. This permits better and more accurate adjustment, and is particularly pertinent and valuable in automated equipment where the damping is critical.

Such a damper adds the capability of a relatively fast settling time even on a highly sensitive scale, and also improves the insensitivity to vibrations.

Further, it has been discovered that in addition to providing for the relatively fixed plunger, the plunger can be secured to an adjustment member which can be reached from the exterior of the overall assembly, thereby permitting adjustment during operation without disassembly of the machine.

Accordingly, production of an improved weight sensing apparatus of the character above described becomes the principal object of this invention, with other objects thereof becoming more apparent upon a reading of the following brief specification, considered and interpreted in view of the accompanying drawings.

OF THE DRAWINGS

FIG. 4 is a sectional view taken along the line 4—4 of FIG. 1 showing a part of the vibration damping apparatus.

FIG. 5 is a sectional view taken along the line 5—5 of FIG. 4.

FIG. 6 is a sectional view taken along the line 6—6 of FIG. 3.

FIG. 7 is an elevational view of the transducer assembly.

DESCRIPTION OF THE PREFERRED EMBODIMENTS

Figure 1:
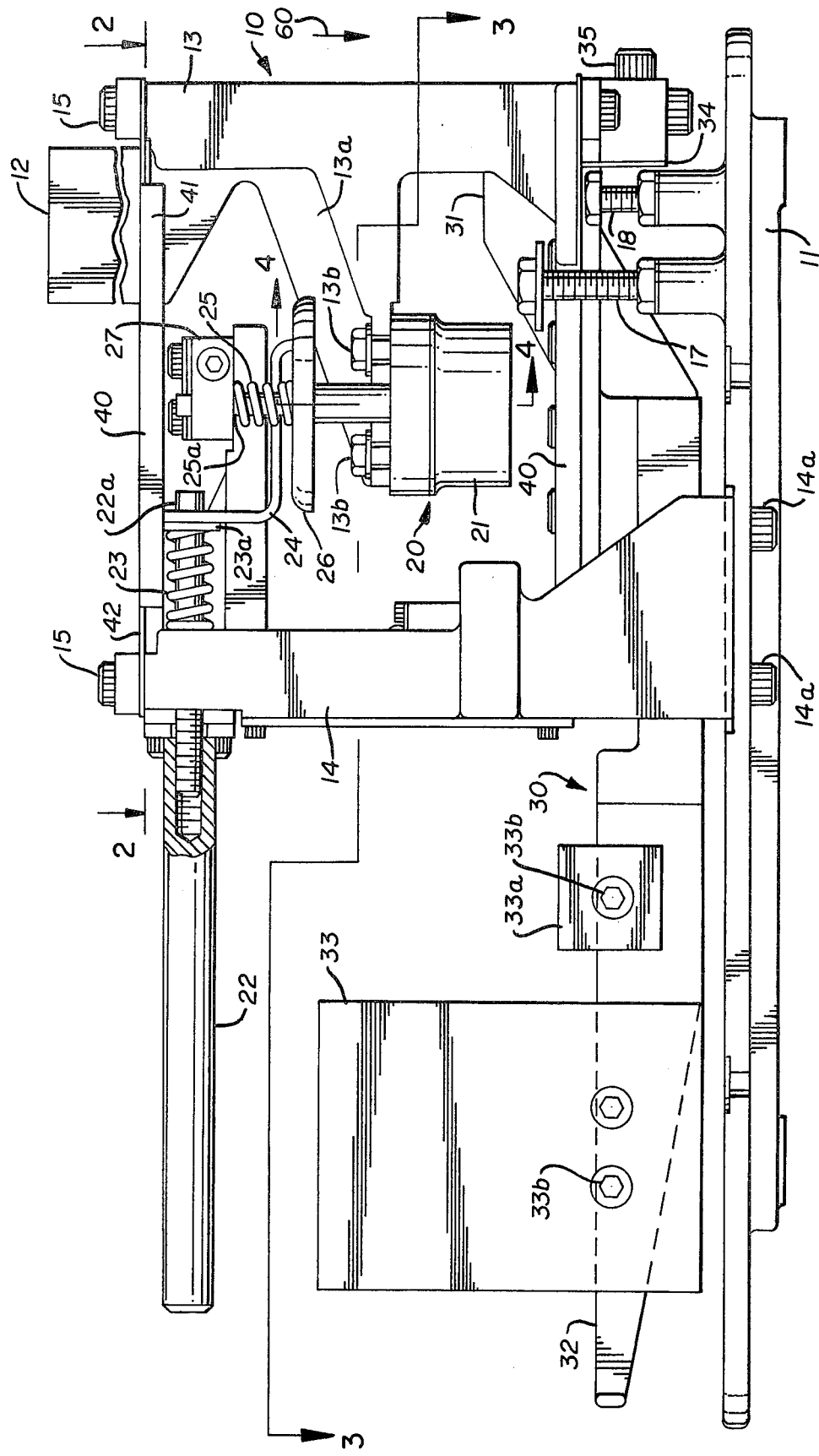
FIG. 1 is an elevational view partially broken away in section on the improved weight sensing apparatus.
Figure 2:
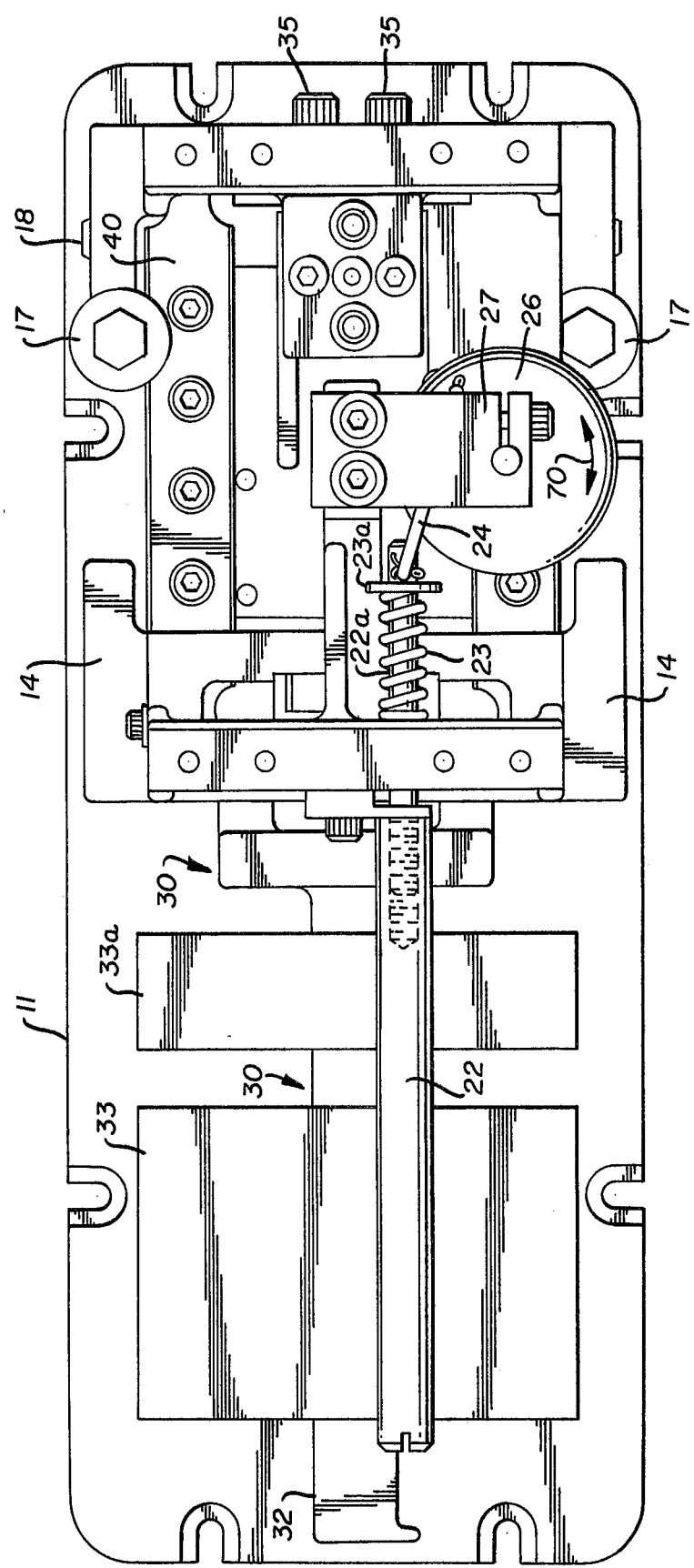
FIG. 2 is a top plan view.

Referring first to FIG. 1, it will be noted that the improved weight sensing apparatus, generally indicated by the numeral 10, includes a scale base 11 and a load receiving platform 12. A movable outrider 13 is provided adjacent one end of the apparatus and has the load receiving platform 12 secured to its upper end.

A fixed vertical support 14 is secured to the scale base 11 by suitable screws 14a, 14a, and the fixed support 14 and outrider 13 are interconnected by a plurality of flexure members 40, 40 which are four in number and form a parallelogram.

Each of these flexure members 40, 40 has an elongate body 41 terminating in opposed weakened ends 42, 42 of reduced thickness. These ends are then secured to the fixed support 14 and the outrider 13 by screws 15, 15 so that the flexures, the fixed support 14 and the outrider 13 form, in effect, an open cube or parallelogram.

The lever or beam which is utilized to reflect the movement of the outrider is generally indicated by the numeral 30 and is elongate in nature having a forward end 31 and a rearward end 32. Adjustable counter balance members 33 and 33a are secured to the rear end by screws 33b, 33b so as to provide a mass counter balance effect as contrasted to some of the spring-type counter balances present in the prior art. While two such counter weights are illustrated, it should be understood that, depending upon the specific use to which the apparatus is put, one may be eliminated.

The forward end 31 of the lever 33 is connected to the outrider 13 at its lower end by means of the vertical flexure member 34, which is loaded in tension, by screws 35, 35. This method of interconnection assures that the force will be carried from platform 12 through outrider 13 and into the flexure 40. Thus, the load is always applied through this flexure and not directly to the lever as in most of the prior art. Also, this arrangement prevents damage to the narrow portions 42, 42 of flexures 40, 40 such as, for example, when the weight is dropped on platform 12.

The middle portion of the lever 30 is secured to the fixed support 14 by means of a transducer assembly and spring element 50. This transducer assembly 50 is mounted so as to be in alignment with either the top or bottom of the parallelogram flexures near the fixed support 14. The transducer includes strain gauges 30 which are electronically connected to a weight meter which is shown herein schematically only.

Figure 3:
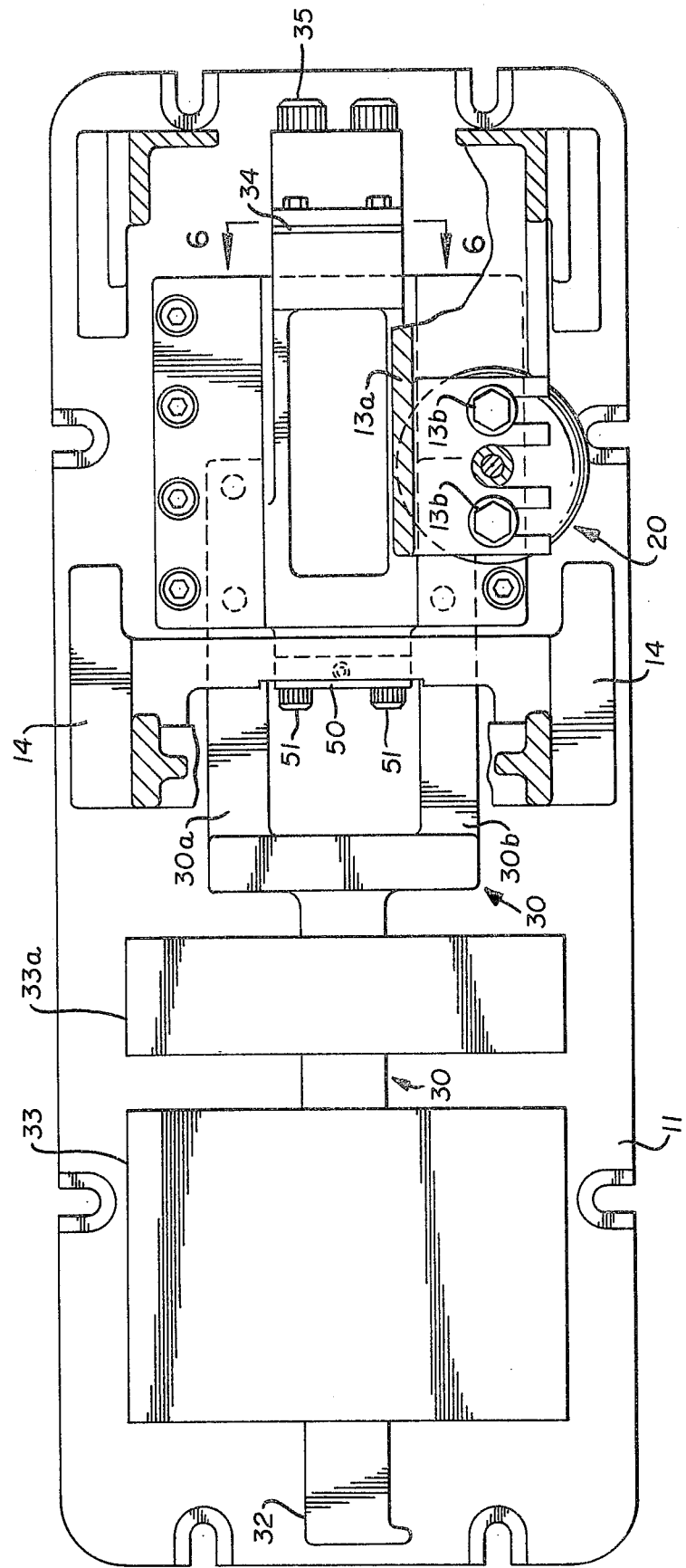
FIG. 3 is a sectional view taken along the line 3—3 of FIG. 1.

Lever 30 (See FIG. 3) is bifurcated at this point and has parallel legs 30a, 30b. The transducer and spring element assembly 50 is thus used to interconnect lever 30 and fixed support 14 by screws 51, 51. This assembly includes spring element 52 having a reduced section 52a to which are secured strain gauges 53, 54. These gauges are shown schematically only, and it will be understood that they are electrically connected to the readout meter in conventional fashion.

Suffice it to say at this point that the spring element is capable of bending in the direction of arrow 55 in response to weight applied to platform 12, and this movement will be measured by the gauges 53, 54 which will send the appropriate signal to the weight meter (not shown).

It will also be noted that outrider stop bolts 17, 17 and 18, 18 are mounted on base 11 to prevent excessive movement and damage to the apparatus.

In operation of the improved weight sensing apparatus, applying a load to the platform 12 will cause the outrider 13 to move in a straight line motion in the direction of the arrow 60. Such movement is really a guided cantilever type straight line movement, and the load is thus applied through the vertical flexure 34 to the lever 30. The lever 30 will, of course, then move; and such movement will cause bending in spring element 52 and be measured by the strain gauges 53, 54 and reflected on the weight meter to indicate the actual degree of movement and translate that into weight measurements.

In automated situations, and also where high accuracy applications are utilized, the spring-mass system has such a low natural frequency that electronic dampening of the oscillators is not practicable.

Accordingly, the present invention also discloses an improved damping mechanism.

Referring to FIGS. 1, 2, 4 and 5, it will be noted that the outrider 13 has an inwardly extending arm 13a which is secured to the well 21 of the hydraulic damping member 20 by the screws 13b, 13b. Secured to the fixed support 14 is the damper adjusting rod 22 which has a stud 22a projecting therefrom with one end threaded in rod 22 and which is encircled by a tension spring 23. A washer 23a is interposed at the end of the spring so that it is trapped between the fixed support 14 and the S-shaped damper adjusting arm 24. The arm 24 is secured to a damper cover 26, and a tension spring 25 surrounds fixed rod 25a and is trapped between the cover 26 and the fixed mounting member 27.

Inside well 21, which is filled with a suitable damping fluid, are a pair of plates 28 and 29 (See FIGS. 4 and 5) which have a plurality of through apertures 28a, 28a and 29a, 29a therein. Plate 28 is secured to sleeve 26a which is, in turn, secured to cover 26.

In operation, turning adjusting rod 22 will result in movement of rod 22a and thus arm 24 in the direction of arrow 70. Since the arm 24 has one end secured to cover 26, the cover will then rotate about a vertical axis and plate 28 will move relatively of plate 29. This relative movement of the plates will naturally affect the alignment of misalignment, as the case may be, of apertures 28a and 29a; and thus the amount of damping will be controlled from the arm 24.

Also, no movement of well 21 takes place at all during adjustment.

In this fashion, it is possible to adjust the damper assembly by turning the adjusting rod 22 which is accessable from the rear of the assembly even when a protective cover has been placed over it.

In this fashion also, the plunger is essentially fixed and the well 21 is allowed to move during the weighing operation. The external adjustment permits adjustment of the damping mechanism much more quickly than in the prior art where it is usually necessary to remove the protective cover to accomplish any adjustment.

Furthermore, it will be noted that the damper cover 26 is larger in diameter than the well 21 so that in a wet environment where the scales may often be used, water will drip to the outside and not fall into the damper well, thereby distorting the predetermined amount of damping fluid contained therein.

While a full and complete description of the invention has been set forth in accordance with the dictates of the patent statutes, it should be understood that modifications can be resorted to without departing from the spirit hereof or the scope of the appended claims.

In this regard, it should be noted that no detailed disclosure has been made with regard to the weight meter or strain gauges since the electronic structure of the same would be well within the knowledge of one reasonably skilled in this art.

What is claimed is:

1. A weight sensing assembly comprising:
    (A) a fixed vertically extending support;
    (B) a movable vertically extending outrider;
    (C) a plurality of horizontally disposed stabilizing flexure members
        (1) interconnecting said support and said outrider, and
        (2) forming a parallelogram therewith;
    (D) an elongate lever having first and second ends;
    (E) said first end of said lever being secured to said outrider for movement therewith;

(F) a counter balance secured to said second end of said lever
(G) a transducer interconnecting said fixed support with said lever intermediate said first and second ends and disposed in a plane parallel to the plane of said fixed support and adjacent the point of interconnection of said stabilizing flexures and said fixed support; and
(H) means connected to said transducer for measuring the movement of said outrider.

2. The weight sensing assembly of claim 1 wherein said first end of said lever is secured to said outrider by a vertical flexure member at a point beneath the plane of said lever.

3. The weight sensing assembly of claim 1 wherein said transducer includes a vertical flexure
   (A) interconnecting said lever and said fixed support and
   (B) disposed in vertical alignment with one of said stabilizing flexure members.

4. The weight sensing assembly of claim 1 further characterized by the fact that
   (A) said flexure members include weakened areas adjacent their points of connection with said support;
   (B) said transducer including
      (1) a vertical flexure interconnecting said fixed support and said lever; and
      (2) disposed in alignment with one of said weakened areas of said flexure members.

5. The weight sensing assembly of claim 1 characterized by the presence of
   (A) vibration damping means carried by said fixed support and said outrider and include
      (1) a fluid containing damping well secured to said outrider; and
      (2) a damping assembly
         (a) secured to said fixed support, and
         (b) adjustable relatively of said well.

6. A weight sensing assembly comprising:
(A) a fixed support;
(B) a movable outrider;
(C) a plurality of flexure members
   (1) interconnecting said support and said outrider, and
   (2) forming a parallelogram therewith;
(D) an elongate lever having first and second ends;
(E) said first end of said lever being secured to said outrider for movement therewith;
(F) a counter balance secured to said second end of said lever;
(G) a transducer interconnecting said fixed support with said lever intermediate said first and second ends;
(H) means connected to said transducer for measuring the movement of said outrider;
(I) vibration damping means carried by said fixed support and said outrider and including
   (1) a fluid containing well secured to said outrider for movement therewith;
   (2) an adjustment arm carried by said fixed support;
   (3) a cover member
      (a) connected to said adjustment arm for rotational movement upon actuation thereof, and
      (b) overlying said well;
(J) a pair of apertured plates
   (1) received within said well; and
(K) at least one of said plates being connected to said cover for movement therewith
   (1) whereby the alignment of the apertures of said plates may be altered.

7. The weight sensing assembly of claim 6 wherein said cover member has a larger diameter than said well.

* * * * *